US012779669B2

(12) United States Patent
Ge et al.

(10) Patent No.: US 12,779,669 B2
(45) Date of Patent: Nov. 3, 2026

(54) CENTER OF MASS PLANNING METHOD FOR ROBOT, ROBOT AND COMPUTER-READABLE STORAGE MEDIUM

(71) Applicant: UBTECH ROBOTICS CORP LTD, Shenzhen (CN)

(72) Inventors: Ligang Ge, Shenzhen (CN); Yizhang Liu, Shenzhen (CN); Chunyu Chen, Shenzhen (CN); Zheng Xie, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 296 days.

(21) Appl. No.: 18/210,026

(22) Filed: Sep. 19, 2023

(65) Prior Publication Data

US 2023/0415333 A1 Dec. 28, 2023

Related U.S. Application Data

(63) Continuation of application No. PCT/CN2020/140563, filed on Dec. 29, 2020.

(30) Foreign Application Priority Data

Dec. 24, 2020 (CN) ......................... 202011547544.1

(51) Int. Cl.
*B25J 9/16* (2006.01)
*G05B 19/4155* (2006.01)

(52) U.S. Cl.
CPC ........ *B25J 9/1602* (2013.01); *G05B 19/4155* (2013.01); *G05B 2219/40244* (2013.01)

(58) Field of Classification Search
CPC ..... B25J 9/00; B25J 9/16; B25J 9/1602; B25J 9/1605; G05B 19/00; G05B 19/02;
(Continued)

(56) References Cited

U.S. PATENT DOCUMENTS

2005/0240307 A1* 10/2005 Kuroki .................. B25J 13/085
700/245
2019/0118384 A1* 4/2019 Dalibard ............. B25J 19/0008

FOREIGN PATENT DOCUMENTS

CN 106707744 A 5/2017
CN 111015653 A 4/2020

OTHER PUBLICATIONS

ISR for PCT/CN2020/140563.

(Continued)

*Primary Examiner* — Khoi H Tran
*Assistant Examiner* — Sarah A Tran

(57) ABSTRACT

A center of mass (COM) planning method includes: obtaining a planning position of the COM and a planning speed of the COM of a robot, and calculating a planning capture point of the robot according to the planning position of the COM and the planning speed of the COM; obtaining a measured position of the COM and a measured speed of the COM, and calculating a measured capture point of the robot according to the measured position the measured speed; calculating a desired zero moment point (ZMP) of the robot based on the planning capture point and the measured capture point; obtaining a measured ZMP of the robot, and calculating an amount of change in a position of the COM according to the desired ZMP and the measured ZMP; and correcting the planning position of the COM according to the amount of change in the position of the COM.

20 Claims, 7 Drawing Sheets

(58) Field of Classification Search
CPC ................ G05B 19/18; G05B 19/4155; G05B 2219/00; G05B 2219/30; G05B 2219/40; G05B 2219/40244; G05B 2219/40264; G05D 1/00; G05D 1/08; G05D 1/0891
See application file for complete search history.

(56) References Cited

OTHER PUBLICATIONS

Written opinions of ISA for PCT/CN2020/140563.
"Capture Point-Based Controller Using Real-Time Zero Moment Point Manipulation for Stable Bipedal Walking in Human Environment", Young-Dae Hong, Sensors, pp. 1-18, Aug. 3, 2019.

* cited by examiner

CENTER OF MASS PLANNING METHOD FOR ROBOT, ROBOT AND COMPUTER-READABLE STORAGE MEDIUM

CROSS REFERENCE TO RELATED APPLICATIONS

The present application is a continuation-application of International Application PCT/CN2020/140563, with an international filing date of Dec. 29, 2020, which claims foreign priority to Chinese Patent Application No. 202011547544.1, filed on Dec. 24, 2020 in the China National Intellectual Property Administration, the contents of all of which are hereby incorporated by reference in its entirety.

TECHNICAL FIELD

The present disclosure generally relates to robots, and particularly to a center of mass planning method for a robot, robot and computer-readable storage medium.

BACKGROUND

In the motion control process of a legged robot (e.g., a bipedal robot), the result of center of mass (COM) planning in the horizontal direction has a significant impact on the stability of the robot's walking. However, in many conventional COM planning methods, there is a lack of timely correction of the position of the COM, and the accuracy of the results obtained from COM planning based on this is usually low, resulting in poor stability of robot walking.

Therefore, there is a need to provide a COM planning method to overcome the above-mentioned problem.

BRIEF DESCRIPTION OF DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
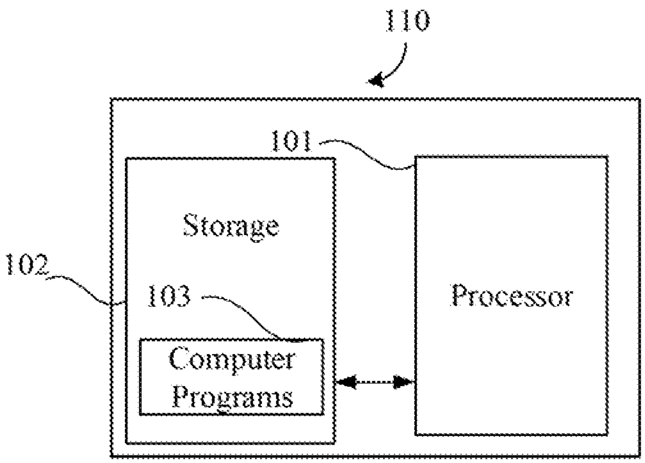
FIG. 1 is a schematic block diagram of a legged robot according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

Figure 4:
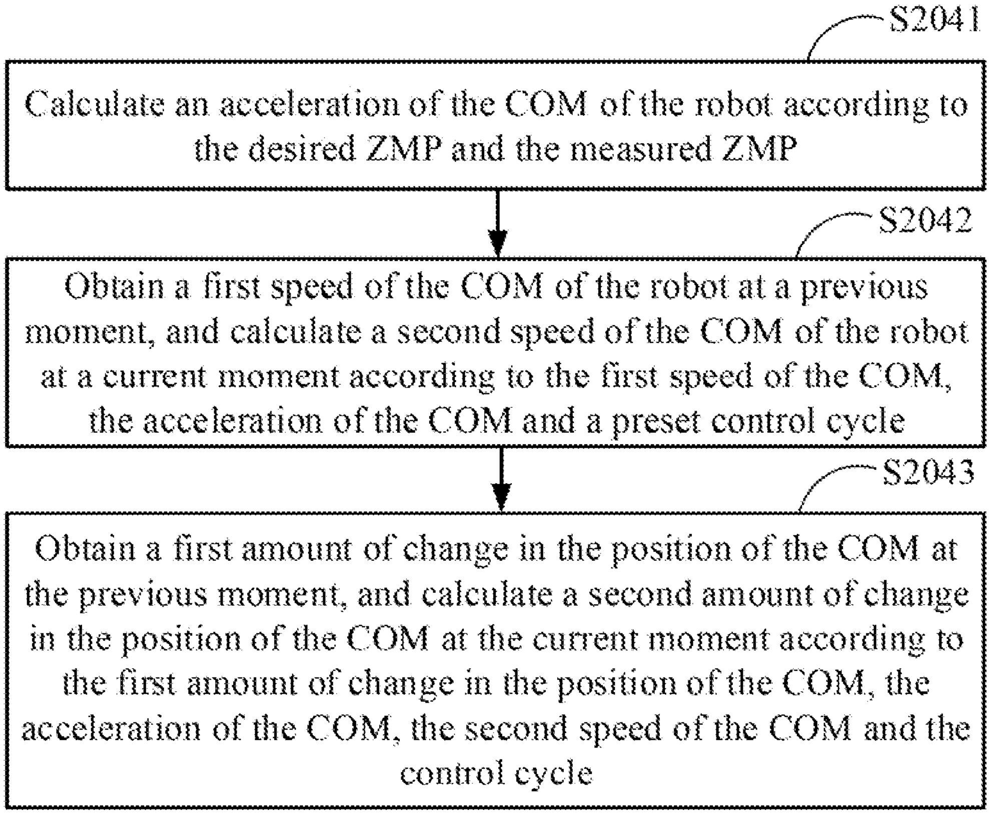
FIG. 4 is an exemplary flowchart of a method for calculating the amount of change in the position of the COM of the robot according to one embodiment.

FIG. 1 shows a schematic block diagram of robot 110 according to one embodiment. The robot 110 may include a processor 101, a storage 102, and one or more executable computer programs 103 that are stored in the storage 102. The storage 102 and the processor 101 are directly or indirectly electrically connected to each other to realize data transmission or interaction. For example, they can be electrically connected to each other through one or more communication buses or signal lines. The processor 101 performs corresponding operations by executing the executable computer programs 103 stored in the storage 102. When the processor 101 executes the computer programs 103, the steps in the embodiments of the method for planning a center of mass (COM) position for a robot, such as steps S201 to S205 in FIG. 2 and steps S2041 to S2043 in FIG. 4 are implemented.

The processor 101 may be an integrated circuit chip with signal processing capability. The processor 101 may be a central processing unit (CPU), a general-purpose processor, a digital signal processor (DSP), an application specific integrated circuit (ASIC), a field-programmable gate array (FPGA), a programmable logic device, a discrete gate, a transistor logic device, or a discrete hardware component. The general-purpose processor may be a microprocessor or any conventional processor or the like. The processor 101 can implement or execute the methods, steps, and logical blocks disclosed in the embodiments of the present disclosure.

The storage 102 may be, but not limited to, a random-access memory (RAM), a read only memory (ROM), a programmable read only memory (PROM), an erasable programmable read-only memory (EPROM), and an electrical erasable programmable read-only memory (EEPROM). The storage 102 may be an internal storage unit of the robot 110, such as a hard disk or a memory. The storage 102 may also be an external storage device of the robot 110, such as a plug-in hard disk, a smart memory card (SMC), and a secure digital (SD) card, or any suitable flash cards. Furthermore, the storage 102 may also include both an internal storage unit and an external storage device. The storage 102 is to store computer programs, other programs, and data required by the robot 110. The storage 102 can also be used to temporarily store data that have been output or is about to be output.

Figure 7:
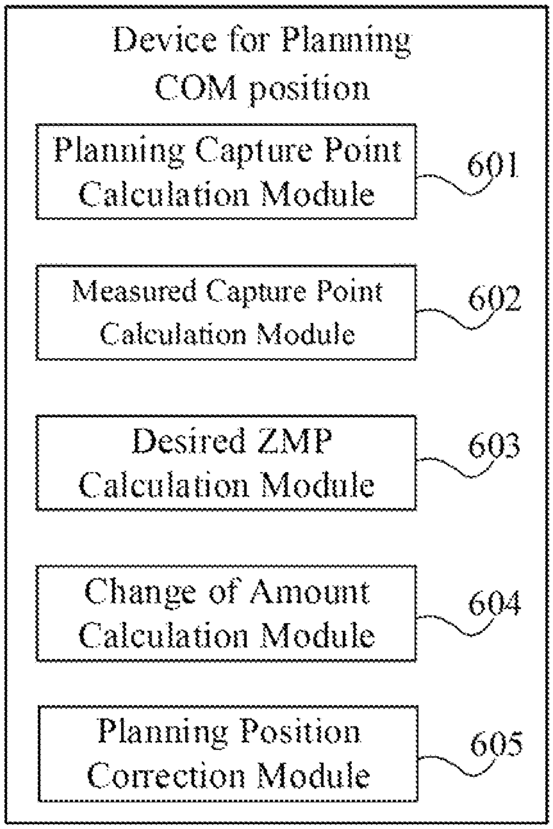
FIG. 7 is schematic block diagram of a device for planning center of mass (COM) for a robot according to one embodiment.

Exemplarily, the one or more computer programs 103 may be divided into one or more modules/units, and the one or more modules/units are stored in the storage 102 and executable by the processor 101. The one or more modules/units may be a series of computer program instruction segments capable of performing specific functions, and the instruction segments are used to describe the execution process of the one or more computer programs 103 in the robot 110. For example, the one or more computer programs 103 may be divided into a planning capture point calculation module 601, a measured capture point calculation module 602, a desired ZMP calculation module 603, a change of amount calculation module 604, and a planning position correction module 605 as shown in FIG. 7.

It should be noted that the block diagram shown in FIG. 1 is only an example of the robot 110. The robot 100 may include more or fewer components than what is shown in FIG. 1, or have a different configuration than what is shown in FIG. 1. Each component shown in FIG. 1 may be implemented in hardware, software, or a combination thereof.

Figure 2:
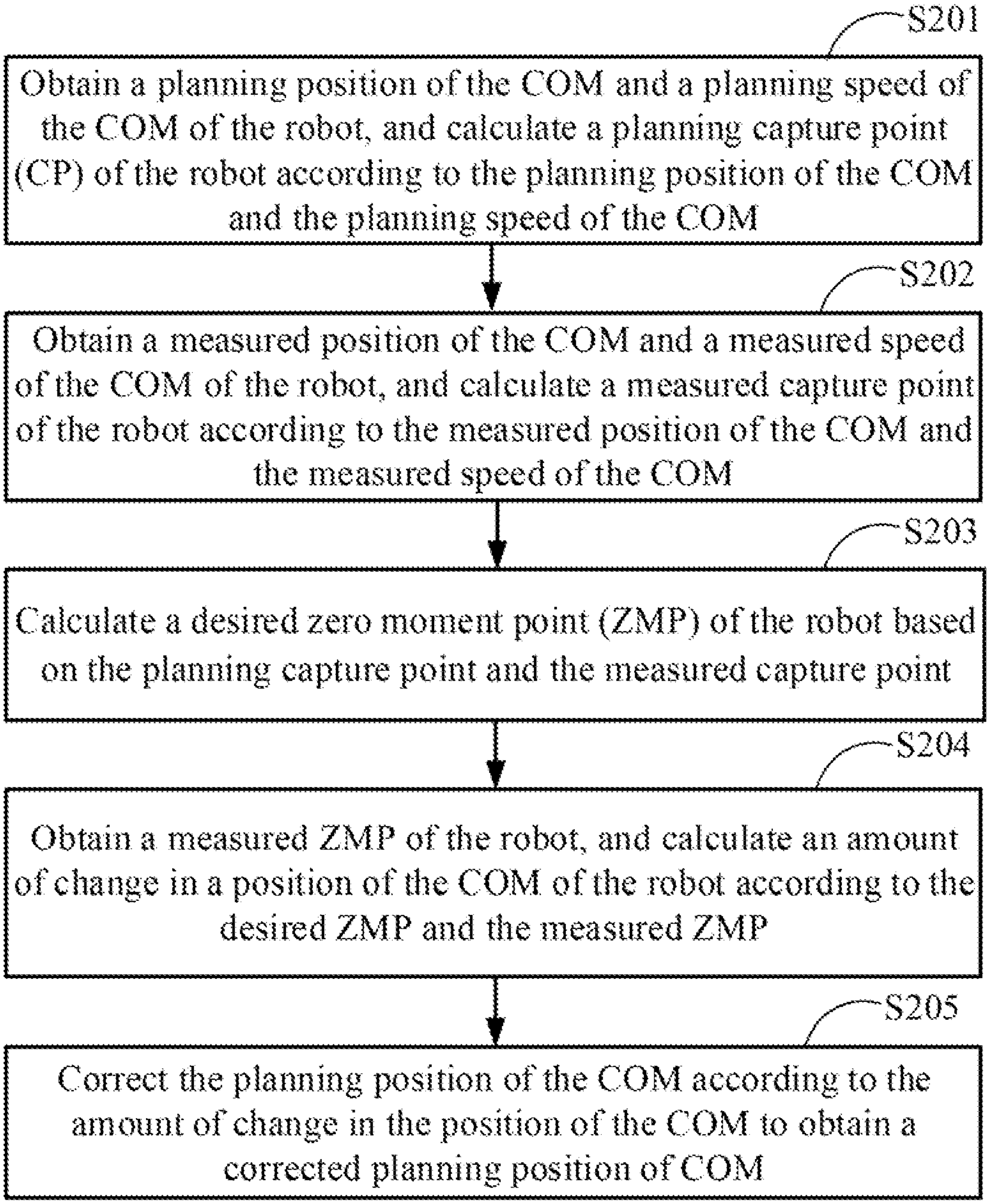
FIG. 2 is an exemplary flowchart of a method for planning center of mass (COM) for a robot according to one embodiment.

FIG. 2 is a schematic flowchart of a center of mass (COM) planning method according to one embodiment. As an example, but not a limitation, the method can be implemented by the robot 110. The method may include the following steps.

Step S201: Obtain a planning position of the COM and a planning speed of the COM of the robot, and calculate a planning capture point (CP) of the robot according to the planning position of the COM and the planning speed of the COM.

Figure 3:
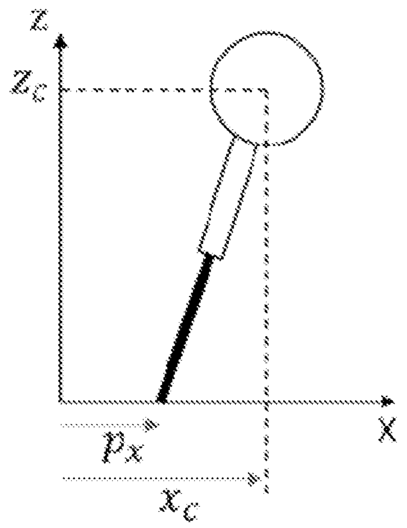
FIG. 3 is a schematic diagram of an LIPM.

In the planning and control of robots, model simplification is usually used to map complex multi rigid body systems. The most classic simplified model is the Linear Inverted Pendulum Model (LIPM) shown in FIG. 3. Taking the sagittal plane as an example, the LIPM kinetic equation is as follows: $\ddot{x}_c=\omega^2(x_c-p_x)$, where $\ddot{x}_c$ represents the acceleration of the COM of the robot, $x_c$ represents the position of the COM of the robot, $p_x$ represents the zero moment point (ZMP) of the robot, $\omega$ represents the natural frequency of LIPM, and $\omega=\sqrt{g/Z_c}$, g represents the acceleration of gravity, and $Z_c$ represents the height of the COM of the robot.

CP is an important concept in LIPM, and its physical meaning is a support point that can realize the complete rest of the inverted pendulum. That is to say, if the robot steps on the CP when it is walking, the center of mass can be completely stationary.

CP can be calculated according to the following equation:

$$\xi_x = x_c + \frac{\dot{x}_c}{\omega},$$

where $\xi_x$ represents CP, and $\dot{x}_c$ represents speed of the COM of the robot.

In one embodiment, the position of the COM and the velocity of the COM of the robot can be planned in advance using any conventional planning approach according to actual needs. Here, the planned position and speed of the COM are referred to as the planning position of the COM and the planning speed of the COM of the robot, respectively. After the planning position of the COM and the planning speed of the COM of the robot are obtained, the CP (i.e., the planning CP) corresponding to the planning position of the COM and the planning speed of the COM of the robot can be calculated according to the following equation:

$$\xi_{plan} = x_{plan} + \frac{\dot{x}_{plan}}{\omega},$$

where $x_{plan}$ represents the planning position of the COM, $\dot{x}_{plan}$ represents the planning speed of the COM, and $\xi_{plan}$ represents the planning CP.

Step S202: Obtain a measured position of the COM and a measured speed of the COM of the robot, and calculate a measured capture point of the robot according to the measured position of the COM and the measured speed of the COM.

In one embodiment, the position and velocity of the COM of the robot can be estimated based on the data measured by one or more six-dimensional force sensors and inertial measurement units (IMUs) pre-installed on the robot using any conventional estimation approach according to actual needs. Here, the estimated position and velocity of the COM of the robot are referred to as the measured position of the COM and the measured speed of the COM of the robot. After the measured position of the COM and the measured speed of the COM are obtained, the CP (i.e., the measured CP) corresponding to the measured position of the COM and the measured speed of the COM of the robot can be calculated according to the following equation:

$$\xi_{measure} = x_{measure} + \frac{\dot{x}_{measure}}{\omega},$$

where $x_{measure}$ represents the measured position of the COM, $\dot{x}_{measure}$ represents the measured speed of the COM, and $\xi_{measure}$ represents the measured CP.

Step S203: Calculate a desired zero moment point (ZMP) of the robot based on the planning capture point and the measured capture point.

The following equation $\dot{\xi}_x=\omega(\xi_x-p_x)$ can be obtained by differentiating the CP $\xi_x$ and substituting the LIPM kinetic equation into the result obtained by differentiating the CP $\xi_x$. The following equation can be obtained by finding the solution to the first order differential equation above: $\xi_x(t)=e^{\omega t}\xi_x(0)+(1-e^{\omega t})p_x$, where $\xi_x(0)$ represents the original position of the CP.

Assuming that $\xi_x(t)$ is equal to $\xi_{plan}$ and $\xi_x(0)$ is equal to $\xi_{measure}$, the CP controller-based desired ZMP can be obtained by substituting $\xi_x(t)$ and $\xi_x(0)$ into the equation above and carrying out shift transformation:

$$p_x = \frac{1}{1-e^{\omega dT}}\xi_{plan} + \left(1 - \frac{1}{1-e^{\omega dT}}\right)\xi_{measure}.\ \text{Let } K_{cp_{control}} = \frac{1}{1-e^{\omega dT}},$$

and dT is the time required for $\xi_{measure}$ to track $\xi_{plan}$, which can be adjusted according to actual situations. In this case, the equation above can be written as: $p_x=K_{cp_{control}}\xi_{plan}+(1-K_{cp_{control}})\xi_{measure}$. By adjusting the controller parameter $K_{cp_{control}}$, the tracking effect of $\xi_{measure}$ on $\xi_{plan}$ can be changed.

Step S204: Obtain a measured ZMP of the robot, and calculate an amount of change in a position of the COM of the robot according to the desired ZMP and the measured ZMP.

In one embodiment, any conventional approach may be adopted according to the actual situation to estimate the actual ZMP of the robot, and the estimated result is referred to as the measured ZMP here. In the case of known desired ZMP and measured ZMP, the amount of change in the position of the COM of the robot can be calculated through the process shown in FIG. 4 that includes the following steps.

Step S2041: Calculate an acceleration of the COM of the robot according to the desired ZMP and the measured ZMP.

Figure 5:
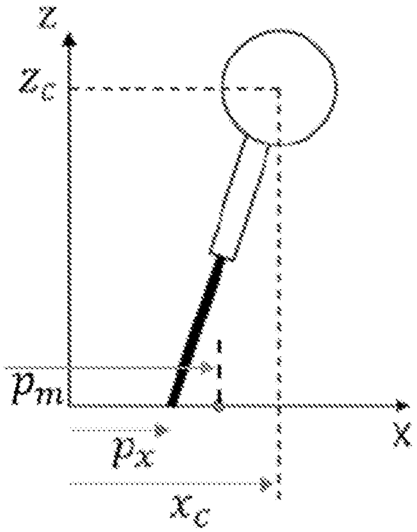
FIG. 5 is a schematic diagram showing the desired ZMP and the measured ZMP.

FIG. 5 is a schematic diagram showing the desired ZMP and the measured ZMP. In one embodiment, the tracking of the desired ZMP can be realized by the ZMP tracking controller established according to the following equation:

$$\ddot{x}_{zmp} = K_{zmp}\frac{g}{Z_c}(p_x - p_m),$$

where $p_x$ represents the desired ZMP, $p_m$ represents the measured ZMP, $K_{zmp}$ represents a preset ZMP tracking controller parameter whose value can be set according to actual situations, and $\ddot{x}_{xmp}$ represents the acceleration of the COM.

Step S2042: Obtain a first speed of the COM of the robot at a previous moment, and calculate a second speed of the COM of the robot at a current moment according to the first speed of the COM, the acceleration of the COM and a preset control cycle.

The motion control of the robot is performed periodically, and the duration between two adjacent motion controls is a control cycle, and its value can be set according to actual situations, which is not limited here. In order to facilitate the distinction, the speed of the COM of the robot at the previous motion control moment is referred to as the first speed of the COM, and the speed of the COM of the robot at the current motion control moment is referred to as the second speed of the COM that can be calculated according to the following equation: $\dot{x}_{zmp(k)}=\dot{x}_{zmp(k-1)}+\ddot{x}_{zmp}\Delta t$, where $\dot{x}_{zmp(k-1)}$ represents the first speed of the COM, $\Delta t$ represents the control cycle, and $\dot{x}_{zmp(k)}$ represents the second speed of the COM.

Step S2043: Obtain a first amount of change in the position of the COM at the previous moment, and calculate a second amount of change in the position of the COM at the current moment according to the first amount of change in the position of the COM, the acceleration of the COM, the second speed of the COM and the control cycle.

In order to facilitate the distinction, the amount of change in the position of the COM of the robot at the previous motion control moment is referred to as the first amount of change in the position of the COM, and the amount of change in the position of the COM of the robot at the current motion control moment is referred to as the second amount of change in the position of the COM that can be calculated according to the following equation: $\Delta X(k)=\Delta X(k-1)+\dot{x}_{zmp(k)}\Delta t+0.5\ddot{x}_{zmp}(\Delta t)^2$, where $X(k-1)$ represents the first amount of change in the position of the COM, and $\Delta X(k)$ represents the second amount of change in the position of the COM.

Through the above process, iterative update can be continuously performed on the amount of change in the position of the COM at each motion control moment.

Step S205: Correct the planning position of the COM according to the amount of change in the position of the COM to obtain a corrected planning position of COM.

In one embodiment, the planning position of the COM can be corrected according to the following equation: $x_c=x_{plan}+\Delta X$, where $\Delta X$ represents the amount of change in the position of the COM, and $x_c$ represents the corrected planning position of the COM.

Figure 6:
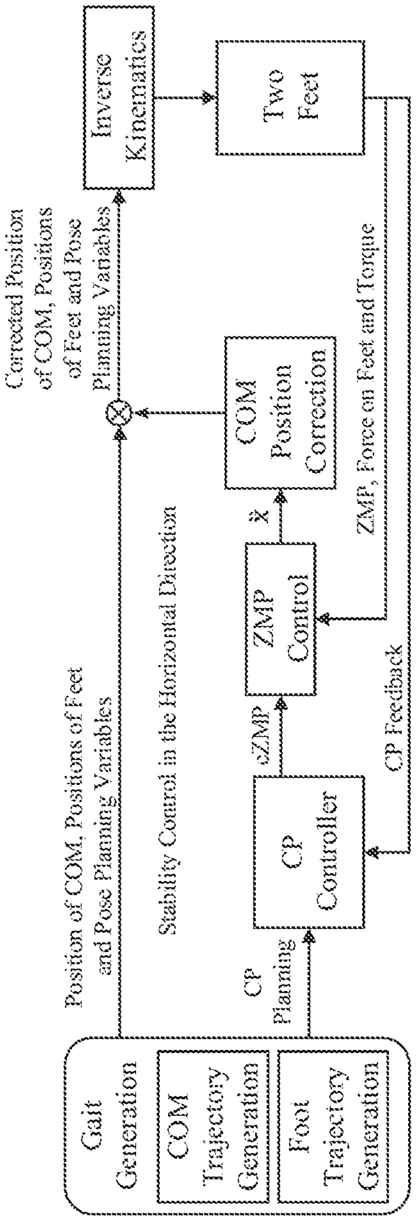
FIG. 6 is a schematic diagram of the horizontal stability control process of the robot.

FIG. 6 is a schematic diagram of the horizontal stability control process of the robot. In the gait generation stage, the robot performs COM trajectory generation and foot-end trajectory generation. The CP controller of the robot calculates the desired ZMP (i.e., cZMP in FIG. 5) according to the planning CP and the measured CP fed back from the two feet of the robot. The ZMP tracking controller calculates the acceleration of the COM according to the desired ZMP and the measured ZMP fed back from the two feet of the robot, and corrects the position of the COM accordingly. By correcting the position of the COM, the closed-loop tracking of the ZMP is realized, and the tracking of the planning CP is also completed in the upper-level control, which ensures the stability of the COM in the horizontal direction.

In summary, by implementing the method described in the embodiments above, the desired ZMP can be timely adjusted according to the motion state of the robot. The real-time tracking of the desired ZMP is realized through the COM position control, so that the position of the COM can be timely corrected. The accuracy of the COM planning based on the corrected position of the COM is high, which greatly improves the stability of the walking of the robot.

It should be understood that sequence numbers of the foregoing processes do not mean particular execution sequences. The execution sequences of the processes should be determined based on functions and internal logic of the processes, and should not be construed as any limitation on the implementation processes of the embodiments of the present disclosure.

Corresponding to the method for planning the COM of the robot described in the embodiments above, FIG. 7 shows a schematic block diagram of a device for planning the COM of a robot according to one embodiment.

In one embodiment, the device may include a planning capture point calculation module 601, a measured capture point calculation module 602, a desired ZMP calculation module 603, a change of amount calculation module 604, and a planning position correction module 605.

The planning capture point calculation module 601 is to obtain a planning position of the COM and a planning speed of the COM of the robot, and calculate a planning capture point (CP) of the robot according to the planning position of the COM and the planning speed of the COM. The measured capture point calculation module 602 is to obtain a measured position of the COM and a measured speed of the COM of the robot, and calculate a measured capture point of the robot according to the measured position of the COM and the measured speed of the COM. The desired ZMP calculation module 603 is to calculate a desired zero moment point (ZMP) of the robot based on the planning capture point and the measured capture point. The change of amount calculation module 604 is to obtain a measured ZMP of the robot, and calculate an amount of change in a position of the COM of the robot according to the desired ZMP and the measured ZMP. The planning position correction module 605 is to correct the planning position of the COM according to the amount of change in the position of the COM to obtain a corrected planning position of COM.

In one embodiment, the change of amount calculation module 604 may include a COM acceleration calculation unit, a COM speed calculation unit, and a change of amount calculation unit. The COM acceleration calculation unit is to calculate an acceleration of the COM of the robot according to the desired ZMP and the measured ZMP. The COM speed calculation unit is to obtain a first speed of the COM of the robot at a previous moment, and calculate a second speed of the COM of the robot at a current moment according to the first speed of the COM, the acceleration of the COM and a preset control cycle. The change of amount calculation unit is to obtain a first amount of change in the position of the COM at the previous moment, and calculate a second amount of change in the position of the COM at the current moment according to the first amount of change in the position of the COM, the acceleration of the COM, the second speed of the COM and the control cycle.

In one embodiment, the COM acceleration calculation unit may calculate the e acceleration of the COM of the robot according to the following equation:

$$\ddot{x}_{zmp} = K_{zmp}\frac{g}{Z_c}(p_x - p_m),$$

where $p_x$ represents the desired ZMP, $p_m$ represents the measured ZMP, $K_{zmp}$ represents a preset ZMP tracking controller parameter, g represents the acceleration of gravity, $Z_c$ represents a height of the COM of the robot, and $\ddot{x}_{zmp}$ represents the acceleration of the COM.

In one embodiment, the COM speed calculation unit may calculate the second speed of the COM according to the following equation: $\dot{x}_{zmp}(k)=\dot{x}_{zmp(k-1)}+\ddot{x}_{zmp}\Delta t$, where $\dot{x}_{zmp(k-1)}$ represents the first speed of the COM, $\ddot{x}_{zmp}$ represents the acceleration of the COM, Δt represents the control cycle, and $\dot{x}_{zmp(k)}$ represents the second speed of the COM.

In one embodiment, the change of amount calculation unit may calculate the second amount of change in the position of the COM according to the following equation: $\Delta X(k)=\Delta X(k-1)+\dot{x}_{zmp(k)}\Delta t+0.5\ddot{x}_{zmp}(\Delta t)^2$, where ΔX(k−1) represents the first amount of change in the position of the COM, $\ddot{x}_{zmp}$ represents the acceleration of the COM, Δt represents the control cycle, $\dot{x}_{zmp(k)}$ represents the second speed of the COM, and ΔX(k) represents the second amount of change in the position of the COM.

In one embodiment, the planning capture point calculation module 601 may calculate the planning capture point according to the following equation:

$$\xi_{plan} = x_{plan} + \frac{\dot{x}_{plan}}{\omega},$$

where $\xi_{plan}$ represents the planning position of the COM, $\dot{x}_{plan}$ represents the planning speed of the COM, ω represents a preset frequency, and $\xi_{plan}$ represents the planning capture point.

In one embodiment, the planning capture point calculation module 601 may calculate the measured capture point according to the following equation:

$$\xi_{measure} = x_{measure} + \frac{\dot{x}_{measure}}{\omega},$$

where $x_{measure}$ represents the measured position of the COM, $\dot{x}_{measure}$ represents the measured speed of the COM, and $\xi_{measure}$ represents the measured capture point.

In one embodiment, the desired ZMP calculation module 603 may calculate the desired ZMP according to the following equation: $p_x=K_{cp_{control}}\xi_{plan}+(1-K_{cp_{control}})\xi_{measure}$, where $\xi_{plan}$ represents the planning capture point, $\xi_{measure}$ represents the measured capture point, $K_{cp_{control}}$ represents a preset controller parameter, and $p_x$ represents the desired ZMP.

It should be noted that the basic principles and technical effects of the device are the same as the aforementioned method. For a brief description, for parts not mentioned in this device embodiment, reference can be made to corresponding description in the method embodiments.

It should be noted that content such as information exchange between the modules/units and the execution processes thereof is based on the same idea as the method embodiments of the present disclosure, and produces the same technical effects as the method embodiments of the present disclosure. For the specific content, refer to the foregoing description in the method embodiments of the present disclosure. Details are not described herein again.

Another aspect of the present disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It should be understood that the disclosed device and method can also be implemented in other manners. The device embodiments described above are merely illustrative. For example, the flowcharts and block diagrams in the accompanying drawings illustrate the architecture, functionality and operation of possible implementations of the device, method and computer program product according to embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition, functional modules in the embodiments of the present disclosure may be integrated into one independent part, or each of the modules may be independent, or two or more modules may be integrated into one independent part. in addition, functional modules in the embodiments of the present disclosure may be integrated into one independent part, or each of the modules may exist alone, or two or more modules may be integrated into one independent part. When the functions are implemented in the form of a software functional unit and sold or used as an independent product, the functions may be stored in a computer-readable storage medium. Based on such an understanding, the technical solutions in the present disclosure essentially, or the part contributing to the prior art, or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

A person skilled in the art can clearly understand that for the purpose of convenient and brief description, for specific working processes of the device, modules and units described above, reference may be made to corresponding processes in the embodiments of the foregoing method, which are not repeated herein.

In the embodiments above, the description of each embodiment has its own emphasis. For parts that are not detailed or described in one embodiment, reference may be made to related descriptions of other embodiments.

A person having ordinary skill in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The functional units and modules in the embodiments may be integrated in one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random-access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented center of mass (COM) planning method for a robot, the method comprising:

providing the robot comprising a processor, one or more force sensors and inertial measurement units (IMUs), wherein the one or more force sensors and the IMUs are electrically coupled to the processor;

obtaining, through the processor, a planning position of the COM and a planning speed of the COM of the robot, and calculating a planning capture point of the robot according to the planning position of the COM and the planning speed of the COM;

obtaining, through the processor, measurement data from the one or more force sensors and the IMUs, obtaining a measured position of the COM and a measured speed of the COM of the robot based on the measurement data, and calculating a measured capture point of the robot according to the measured position of the COM and the measured speed of the COM;

calculating, through the processor, a desired zero moment point (ZMP) of the robot based on the planning capture point and the measured capture point;

obtaining, through the processor, a measured ZMP of the robot, and calculating an amount of change in a position of the COM of the robot according to the desired ZMP and the measured ZMP;

correcting, through the processor, the planning position of the COM according to the amount of change in the position of the COM to obtain a corrected planning position of the COM; and controlling, through the processor, the robot to walk based on the corrected planning position of the COM.

2. The method of claim 1, wherein calculating the amount of change in the position of the COM of the robot according to the desired ZMP and the measured ZMP comprises:

calculating an acceleration of the COM of the robot according to the desired ZMP and the measured ZMP;

obtaining a first speed of the COM of the robot at a previous moment, and calculating a second speed of the COM of the robot at a current moment according to the first speed of the COM, the acceleration of the COM and a preset control cycle; and obtaining a first amount of change in the position of the COM at the previous moment, and calculating a second amount of change in the position of the COM at the current moment according to the first amount of change in the position of the COM, the acceleration of the COM, the second speed of the COM and the control cycle.

3. The method of claim 2, wherein the acceleration of the COM of the robot is calculated according to the following equation:

$$\ddot{x}_{zmp} = K_{zmp}\frac{g}{Z_c}(p_x - p_m),$$

where $p_x$ represents the desired ZMP, $p_m$ represents the measured ZMP, $K_{zmp}$ represents a preset ZMP tracking controller parameter, g represents the acceleration of gravity, $Z_c$ represents a height of the COM of the robot, and $\ddot{x}_{zmp}$ represents the acceleration of the COM.

4. The method of claim 2, wherein the second speed of the COM is calculated according to the following equation: $\dot{x}_{zmp(k)}=\dot{x}_{zmp(k-1)}+\ddot{x}_{zmp}\Delta t$, where $\dot{x}_{zmp(k-1)}$ represents the first speed of the COM, $\ddot{x}_{zmp}$ represents the acceleration of the COM, $\Delta t$ represents the control cycle, and $\dot{x}_{zmp(k)}$ represents the second speed of the COM.

5. The method of claim 2, wherein the second amount of change in the position of the COM is calculated according to the following equation: $\Delta X(k)=\Delta X(k-1)+\dot{x}_{zmp(k)}\Delta t+0.5\ddot{x}_{zmp}(\Delta t)^2$, where $\Delta X(k-1)$ represents the first amount of change in the position of the COM, $\ddot{x}_{zmp}$ represents the acceleration of the COM, $\Delta t$ represents the control cycle, $\dot{x}_{zmp(k)}$ represents the second speed of the COM, and $\Delta X(k)$ represents the second amount of change in the position of the COM.

6. The method of claim 1, wherein the planning capture point is calculated according to the following equation:

$$\xi_{plan} = x_{plan} + \frac{\dot{x}_{plan}}{\omega},$$

where $\xi_{plan}$ represents the planning position of the COM, $\dot{x}_{plan}$ represents the planning speed of the COM, $\omega$ represents a preset frequency, and $\xi_{plan}$ represents the planning capture point; the measured capture point is calculated according to the following equation:

$$\xi_{measure} = x_{measure} + \frac{\dot{x}_{measure}}{\omega},$$

where $x_{measure}$ represents the measured position of the COM, $\dot{x}_{measure}$ represents the measured speed of the COM, and $\xi_{measure}$ represents the measured capture point.

7. The method of claim 1, wherein the desired ZMP is calculated according to the following equation: $p_x=K_{cp_{control}}\xi_{plan}+(1-K_{cp_{control}})\xi_{measure}$, where $\xi_{plan}$ represents the planning capture point, $\xi_{measure}$ represents the measured capture point, $K_{cp_{control}}$ represents a preset controller parameter, and $p_x$ represents the desired ZMP.

8. A legged robot comprising:

one or more processors;

one or more force sensors and inertial measurement units (IMUs) electrically coupled to the one or more processors; and a memory coupled to the one or more processors, the memory storing programs that, when executed by the one or more processors, cause performance of operations comprising:

obtaining a planning position of the COM and a planning speed of the COM of the robot, and calculating a planning capture point of the robot according to the planning position of the COM and the planning speed of the COM;

obtaining measurement data from the one or more force sensors and the IMUs, obtaining a measured position of the COM and a measured speed of the COM of the robot based on the measurement data, and calculating a measured capture point of the robot according to the measured position of the COM and the measured speed of the COM;

calculating a desired zero moment point (ZMP) of the robot based on the planning capture point and the measured capture point;

obtaining a measured ZMP of the robot, and calculating an amount of change in a position of the COM of the robot according to the desired ZMP and the measured ZMP;

correcting the planning position of the COM according to the amount of change in the position of the COM to obtain a corrected planning position of the COM; and controlling the robot to walk based on the corrected planning position of the COM.

9. The robot of claim 8, wherein calculating the amount of change in the position of the COM of the robot according to the desired ZMP and the measured ZMP comprises:

calculating an acceleration of the COM of the robot according to the desired ZMP and the measured ZMP;

obtaining a first speed of the COM of the robot at a previous moment, and calculating a second speed of the COM of the robot at a current moment according to the first speed of the COM, the acceleration of the COM and a preset control cycle; and obtaining a first amount of change in the position of the COM at the previous moment, and calculating a second amount of change in the position of the COM at the current moment according to the first amount of change in the position of the COM, the acceleration of the COM, the second speed of the COM and the control cycle.

10. The robot of claim 9, wherein the acceleration of the COM of the robot is calculated according to the following equation:

$$\ddot{x}_{zmp} = K_{zmp}\frac{g}{Z_c}(p_x - p_m),$$

where $p_x$ represents the desired ZMP, $p_m$ represents the measured ZMP, $K_{zmp}$ represents a preset ZMP tracking controller parameter, g represents the acceleration of gravity, $Z_c$ represents a height of the COM of the robot, and $\ddot{x}_{zmp}$ represents the acceleration of the COM.

11. The robot of claim 9, wherein the second speed of the COM is calculated according to the following equation: $\dot{x}_{zmp(k)}=\dot{x}_{zmp(k-1)}+\ddot{x}_{zmp}\Delta t$, where $\dot{x}_{zmp(k-1)}$ represents the first speed of the COM, $\ddot{x}_{zmp}$ represents the acceleration of the COM, $\Delta t$ represents the control cycle, and $\dot{x}_{zmp(k)}$ represents the second speed of the COM.

12. The robot of claim 9, wherein the second amount of change in the position of the COM is calculated according to the following equation: $\Delta X(k)=\Delta X(k-1)+\dot{x}_{zmp(k)}\Delta t+0.5\ddot{x}_{zmp}(\Delta t)^2$, where $\Delta X(k-1)$ represents the first amount of change in the position of the COM, $\ddot{x}_{zmp}$ represents the acceleration of the COM, $\Delta t$ represents the control cycle, $\dot{x}_{zmp(k)}$ represents the second speed of the COM, and $\Delta X(k)$ represents the second amount of change in the position of the COM.

13. The robot of claim 8, wherein the planning capture point is calculated according to the following equation:

$$\xi_{plan} = x_{plan} + \frac{\dot{x}_{plan}}{\omega},$$

where $\xi_{plan}$ represents the planning position of the COM, $\dot{x}_{plan}$ represents the planning speed of the COM, ω represents a preset frequency, and $\xi_{plan}$ represents the planning capture point; the measured capture point is calculated according to the following equation:

$$\xi_{measure} = x_{measure} + \frac{\dot{x}_{measure}}{\omega},$$

where $x_{measure}$ represents the measured position of the COM, $\dot{x}_{measure}$ represents the measured speed of the COM, and $\xi_{measure}$ represents the measured capture point.

14. The robot of claim 8, wherein the desired ZMP is calculated according to the following equation: $p_x=K_{cp_{control}}\xi_{plan}+(1-K_{cp_{control}})\xi_{measure}$, where $\xi_{plan}$ represents the planning capture point, $\xi_{measure}$ represents the measured capture point, $K_{cp_{control}}$ represents a preset controller parameter, and $p_x$ represents the desired ZMP.

15. A non-transitory computer-readable storage medium storing instructions that, when executed by at least one processor of a legged robot, cause the at least one processor to perform a method, the method comprising:

obtaining a planning position of the COM and a planning speed of the COM of the robot, and calculating a planning capture point of the robot according to the planning position of the COM and the planning speed of the COM;

obtaining measurement data from one or more force sensors and inertial measurement units installed on the robot, obtaining a measured position of the COM and a measured speed of the COM of the robot based on the measurement data, and calculating a measured capture point of the robot according to the measured position of the COM and the measured speed of the COM;

calculating a desired zero moment point (ZMP) of the robot based on the planning capture point and the measured capture point;

obtaining a measured ZMP of the robot, and calculating an amount of change in a position of the COM of the robot according to the desired ZMP and the measured ZMP;

correcting the planning position of the COM according to the amount of change in the position of the COM to obtain a corrected planning position of the COM; and controlling the robot to walk based on the corrected planning position of the COM.

16. The non-transitory computer-readable storage medium of claim 15, wherein calculating the amount of change in the position of the COM of the robot according to the desired ZMP and the measured ZMP, comprises:

performing iterative update on the amount of change in the position of the COM of the robot according to the desired ZMP and the measured ZMP.

17. The non-transitory computer-readable storage medium of claim 16, wherein performing the iterative update on the amount of change in the position of the COM of the robot according to the desired ZMP and the measured ZMP comprises:

calculating an acceleration of the COM of the robot according to the desired ZMP and the measured ZMP;

obtaining a first speed of the COM of the robot at a previous moment, and calculating a second speed of the COM of the robot at a current moment according to the first speed of the COM, the acceleration of the COM and a preset control cycle; and obtaining a first amount of change in the position of the COM at the previous moment, and calculating a second amount of change in the position of the COM at the current moment according to the first amount of change in the position of the COM, the acceleration of the COM, the second speed of the COM and the control cycle.

18. The non-transitory computer-readable storage medium of claim 17, wherein the acceleration of the COM of the robot is calculated according to the following equation:

$$\ddot{x}_{zmp} = K_{zmp}\frac{g}{Z_c}(p_x - p_m),$$

where $p_x$ represents the desired ZMP, $P_m$ represents the measured ZMP, $K_{zmp}$ represents a preset ZMP tracking controller parameter, g represents the acceleration of gravity, $Z_c$ represents a height of the COM of the robot, and $\dot{x}_{zmp}$ represents the acceleration of the COM.

19. The non-transitory computer-readable storage medium of claim 17, wherein the second speed of the COM is calculated according to the following equation: $\dot{x}_{zmp(k)}=\dot{x}_{zmp(k-1)}+\ddot{x}_{zmp}\Delta t$, where $\dot{x}_{zmp(k-1)}$ represents the first speed of the COM, $\ddot{x}_{zmp}$represents the acceleration of the COM, $\Delta t$ represents the control cycle, and $\dot{x}_{zmp(k)}$ represents the second speed of the COM.

20. The non-transitory computer-readable storage medium of claim 17, wherein the second amount of change in the position of the COM is calculated according to the following equation: represents $\Delta X(k)=\Delta X(k-1)+\dot{x}_{zmp(k)}\Delta t+0.5\ddot{x}_{zmp}(\Delta t)^2$, where $\Delta X(k-1)$ the first amount of change in the position of the COM, $\ddot{x}_{zmp}$ represents the acceleration of the COM, At represents the control cycle, $\dot{x}_{zmp(k)}$ represents the second speed of the COM, and $\Delta X(k)$ represents the second amount of change in the position of the COM.

* * * * *